US010334511B2

(12) United States Patent
Trainin et al.

(10) Patent No.: US 10,334,511 B2
(45) Date of Patent: Jun. 25, 2019

(54) METHODS FOR SCANNING IN DIRECTIVE MULTI-GIGABIT NETWORK

(71) Applicant: Intel IP Corporation, Santa Clara, CA (US)

(72) Inventors: Solomon B. Trainin, Haifa (IL);
Michael Glik, Kfar Saba (IL);
Alexander Sirotkin, Tel-Aviv (IL);
Carlos Cordeiro, Portland, OR (US);
Elad Levy, Nes Ziona (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/396,241

(22) Filed: Dec. 30, 2016

(65) Prior Publication Data

US 2018/0192356 A1 Jul. 5, 2018

(51) Int. Cl.
| H04L 12/26 | (2006.01) |
| H04W 48/16 | (2009.01) |
| H04W 16/28 | (2009.01) |
| H04B 17/336 | (2015.01) |
| H04W 48/10 | (2009.01) |
| H04W 52/24 | (2009.01) |
| H04W 52/26 | (2009.01) |
| H04B 17/309 | (2015.01) |

(52) U.S. Cl.
CPC ......... *H04W 48/16* (2013.01); *H04B 17/309* (2015.01); *H04B 17/336* (2015.01); *H04W 16/28* (2013.01); *H04W 48/10* (2013.01); *H04W 52/242* (2013.01); *H04W 52/262* (2013.01)

(58) Field of Classification Search
USPC ....... 370/229, 230, 236, 252, 312, 328, 329, 370/334, 339
See application file for complete search history.

(56) References Cited

U.S. PATENT DOCUMENTS

| 2005/0122912 A1* | 6/2005 | Jeon ...................... H04L 1/0003 370/252 |
| 2012/0009880 A1* | 1/2012 | Trainin ................. H04W 24/00 455/67.11 |

(Continued)

OTHER PUBLICATIONS

"U.S. Appl. No. 15/396,241, filed Jul. 2, 2018 to Restriction Requirement dated May 3, 2018", 8 pgs.

*Primary Examiner* — Kwang B Yao
*Assistant Examiner* — Nguyen H Ngo
(74) *Attorney, Agent, or Firm* — Schwegman Lundberg & Woessner, P.A.

(57) ABSTRACT

Embodiments of methods for scanning in a directive multi-gigabit network are generally described herein. An apparatus of a station may include processing circuitry configured to decode a sector sweep beacon received from an access point, encode for transmission a sector sweep feedback message to include a beam refinement protocol (BRP) request, and encode for transmission BRP responses to BRP signaling received from the access point. The processing circuitry may be further configured to decode a link margin feedback signal received from the access point to determine an access point link margin, measure signal information associated with the link margin feedback signal to determine a received link margin measurement, and encode signaling for association with the access point based on the access point link quality and the receive link quality.

13 Claims, 7 Drawing Sheets

(56) References Cited

U.S. PATENT DOCUMENTS

| | | | | |
|---|---|---|---|---|
| 2014/0029453 | A1* | 1/2014 | Trainin | H04W 24/10 |
| | | | | 370/252 |
| 2015/0156788 | A1* | 6/2015 | Yu | H04L 1/0003 |
| | | | | 370/329 |
| 2015/0289147 | A1* | 10/2015 | Lou | H04B 7/0408 |
| | | | | 370/329 |
| 2016/0285522 | A1* | 9/2016 | Kasher | H04B 7/043 |
| 2017/0085306 | A1* | 3/2017 | Cariou | H04B 7/0452 |
| 2017/0134076 | A1* | 5/2017 | Maamari | H04B 7/0452 |
| 2017/0207839 | A1* | 7/2017 | Eitan | H04B 7/0617 |
| 2017/0347340 | A1* | 11/2017 | Haley | H04L 25/0204 |
| 2018/0020389 | A1* | 1/2018 | Abdallah | H04B 7/0617 |
| 2018/0083679 | A1* | 3/2018 | Lim | H04B 7/06 |
| 2018/0145732 | A1* | 5/2018 | Shen | H04B 7/0617 |

* cited by examiner

| BIT NO. | B0-B4 | B5 | B6 | B7 | ... | B25-B26 | B27 | B28-B31 |
|---|---|---|---|---|---|---|---|---|
| | L-RX | TX-TRN REQ | MID-REQ | BC-REQ | ... | TX ANTENNA ID | LM FEEDBACK | RESERVED |
| NUM OF BITS | 5 | 1 | 1 | 1 | | 2 | 1 | 4 |

FIG. 5

METHODS FOR SCANNING IN DIRECTIVE MULTI-GIGABIT NETWORK

TECHNICAL FIELD

Embodiments pertain to wireless networks. Some embodiments relate to wireless local area networks (WLANs) and Wi-Fi networks including networks operating in accordance with the IEEE 802.11 family of standards. Some embodiments relate to millimeter wave (mmWave) communication, including mmWave communication in accordance with IEEE 802.11 ad, IEEE 802.1 lay and/or Fifth Generation (5G) networks.

BACKGROUND

Scanning is a feature in wireless network management that a station (STA) may use to retrieve information about basic service set (BSS) deployments in specific frequency bands and channels. This information may be used to make a decision to associate with a specific BSS, transfer to another BSS, create a BSS in specific frequency channel, switching channels, etc. However, in directive multi-gigabit (DMG) networks operating in 60 GHz, link quality determined based on beacons and probe may not reflect link quality related to data transfer because the transmitting and receiving antenna configurations for the communicating stations at beacon and probe reception may be different (quasi-omni vs. directional) from the antenna configurations at time of data transfer. Therefore, a best sector identified during beaconing may be inadequate for data transfer and an association is made.

BRIEF DESCRIPTION OF THE DRAWINGS

FIG. 5 is a table of an exemplary BRS request field according to some embodiments of the disclosure.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
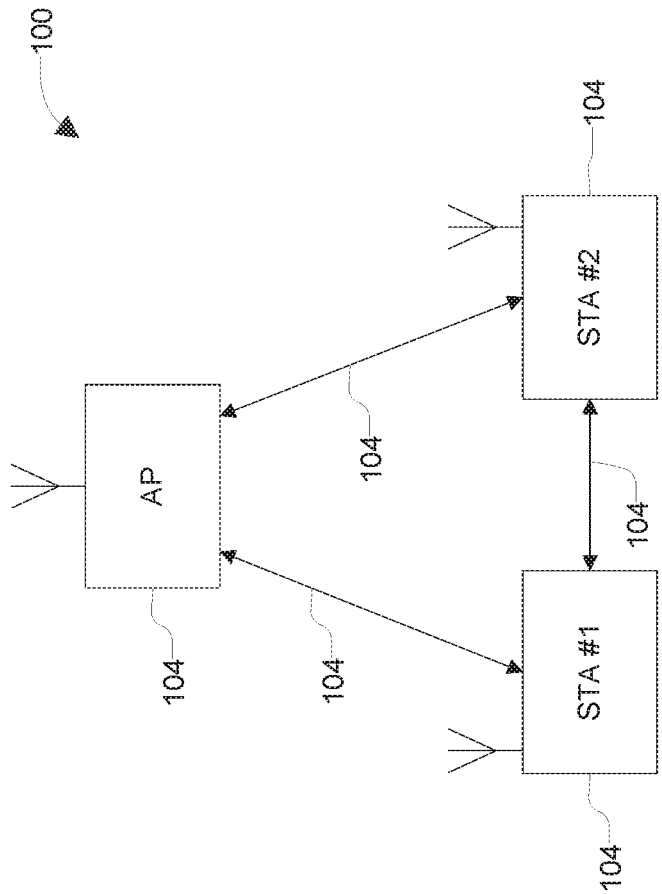
FIG. 1 illustrates a wireless network in accordance with some embodiments.

FIG. 1 illustrates a wireless network in accordance with some embodiments. In some embodiments, the network 100 may be a Wireless Local Area Network (WLAN) or a Wi-Fi network, although the scope of embodiments is not limited in this respect. It should be noted that embodiments are not limited to the number or type of components shown in the example network 100. Embodiments are also not limited by the example network 100 in terms of the arrangement of the components or the connectivity between components as shown. In addition, some embodiments may include additional components.

The example network 100 may include one or more access points (APs) 102 and one or more stations (STAs) 103. In some embodiments, the AP 102 may be arranged to operate in accordance with one or more IEEE 802.11 standards. These embodiments are not limiting, however, as other base station components, which may or may not be arranged to operate in accordance with a standard, may be used in some embodiments. As an example, an Evolved Node-B (eNB) arranged to operate in accordance with one or more Third Generation Partnership Project (3GPP) standards, including but not limited to 3GPP Long Term Evolution (LTE) standards, may be used in some cases. In some embodiments, the STAs 103 may be arranged to operate in accordance with one or more IEEE 802.11 standards. These embodiments are not limiting, however, as other mobile devices, portable devices and/or other devices, which may or may not be arranged to operate in accordance with a standard, may be used in some embodiments. As an example, a User Equipment (UE) arranged to operate in accordance with one or more Third Generation Partnership Project (3GPP) standards, including but not limited to 3GPP LTE standards, may be used in some cases.

In some embodiments, the STAs 103 may be configured to communicate with the AP 102 and/or with other STAs 103. As shown in the example network 100 in FIG. 1, STA #1 may communicate with the AP 102 over the wireless link 105 and STA #2 may communicate with the AP 102 over the wireless link 110. In some embodiments, direct communication between STAs 103 may be possible, such as over the wireless link 115 between STA #1 and STA #2. These embodiments are not limiting, however, as the direction communication between STAs 103 may not necessarily be possible in some embodiments.

In some embodiments, the communication between the AP 102 and the STAs 103 and/or the communication between the STAs 103 may be performed in accordance with one or more standards, such as an 802.11 standard (including legacy 802.11 standards), a 3GPP standard (including 3GPP LTE standards) and/or other standards. These embodiments are not limiting, however, as other communication techniques and/or protocols, which may or may be included in a standard, may be used for the communication between the AP 102 and the STAs 103 and/or the communication between the STAs 103, in some embodiments.

In accordance with some embodiments, the AP 102 may transmit one or more downlink frames to the STA 103 in accordance with a downlink frame format. These embodiments will be described in more detail below.

It should be noted that the STAs 103, the AP 102, mobile devices, base stations and/or other devices may be configured to operate in various frequency bands, including but not limited to millimeter wave (mmWave), ultra high frequency (UHF), microwave and/or other frequency bands. In some cases, phase noise levels of receiver components, such as oscillators and phase-lock loops (PLLs) and/or others, may affect receiver performance. Such phase noise levels may be significantly higher, in some cases, for operation in mmWave frequency bands in comparison to operation in other frequency bands. For instance, traditional wireless systems may operate in the UHF and microwave frequency bands, in some cases. Accordingly, techniques and/or operations that address receiver phase noise may be more challenging for systems operating in the mmWave frequency bands.

In some embodiments, the STAs 103, AP 102, other mobile devices, other base stations and/or other devices may be configured to perform operations related to contention based communication. As an example, the communication between the STAs 103 and/or AP 102 and/or the communication between the STAs 103 may be performed in accordance with contention based techniques. In such cases, the STAs 103 and/or AP 102 may be arranged to contend for a wireless medium (e.g., during a contention period) to receive exclusive control of the medium for a transmission period. For instance, the transmission period may include a transmission opportunity (TXOP), which may be included in an 802.11 standard and/or other standard.

It should be noted that embodiments are not limited to usage of contention based techniques, however, as some communication (such as that between mobile devices and/or communication between a mobile device and a base station) may be performed in accordance with schedule based techniques. Some embodiments may include a combination of contention based techniques and schedule based techniques.

In some embodiments, the communication between mobile devices and/or between a mobile device and a base station may be performed in accordance with single carrier techniques. As an example, a protocol data unit (PDU) and/or other data frame may be modulated on a single carrier frequency in accordance with a single carrier modulation (SCM) technique.

In some embodiments, the communication between mobile devices and/or between a mobile device and a base station may be performed in accordance with any suitable multiple-access techniques and/or multiplexing techniques. Accordingly, one or more of orthogonal frequency division multiple access (OFDMA), orthogonal frequency division multiplexing (OFDM), code-division multiple access (CDMA), time-division multiple access (TDMA), frequency division multiplexing (FDMA), space-division multiple access (SDMA), multiple-input multiple-output (MIMO), multi-user (MU) multiple-input multiple-output (MIMO) (MU-MIMO) and/or other techniques may be employed in some embodiments.

In some embodiments, channels used for communication between STAs 103 and/or APs 102 may be 2.16 GHz, 4.32 GHz, 6.48 GHz, 8.72 GHz and/or other suitable value. In some embodiments, channels used for communication between STAs 103 and/or APs 102 may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel may be configured for transmitting a number of spatial streams, in some embodiments. The values given above may be part of an 802.11 standard, in some cases, although embodiments are not limited as such. For instance, a 2.16 GHz channel may be used in accordance with an 802.11ad standard, and any of 2.16, 4.32, 6.48 or 8.72 GHz may be used in accordance with a channel bonding technique of an 802.11ay standard. These embodiments are not limiting, however, as other suitable bandwidths may be used in some embodiments. In addition, embodiments are not limited to channel types or channel sizes that are included in a standard.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
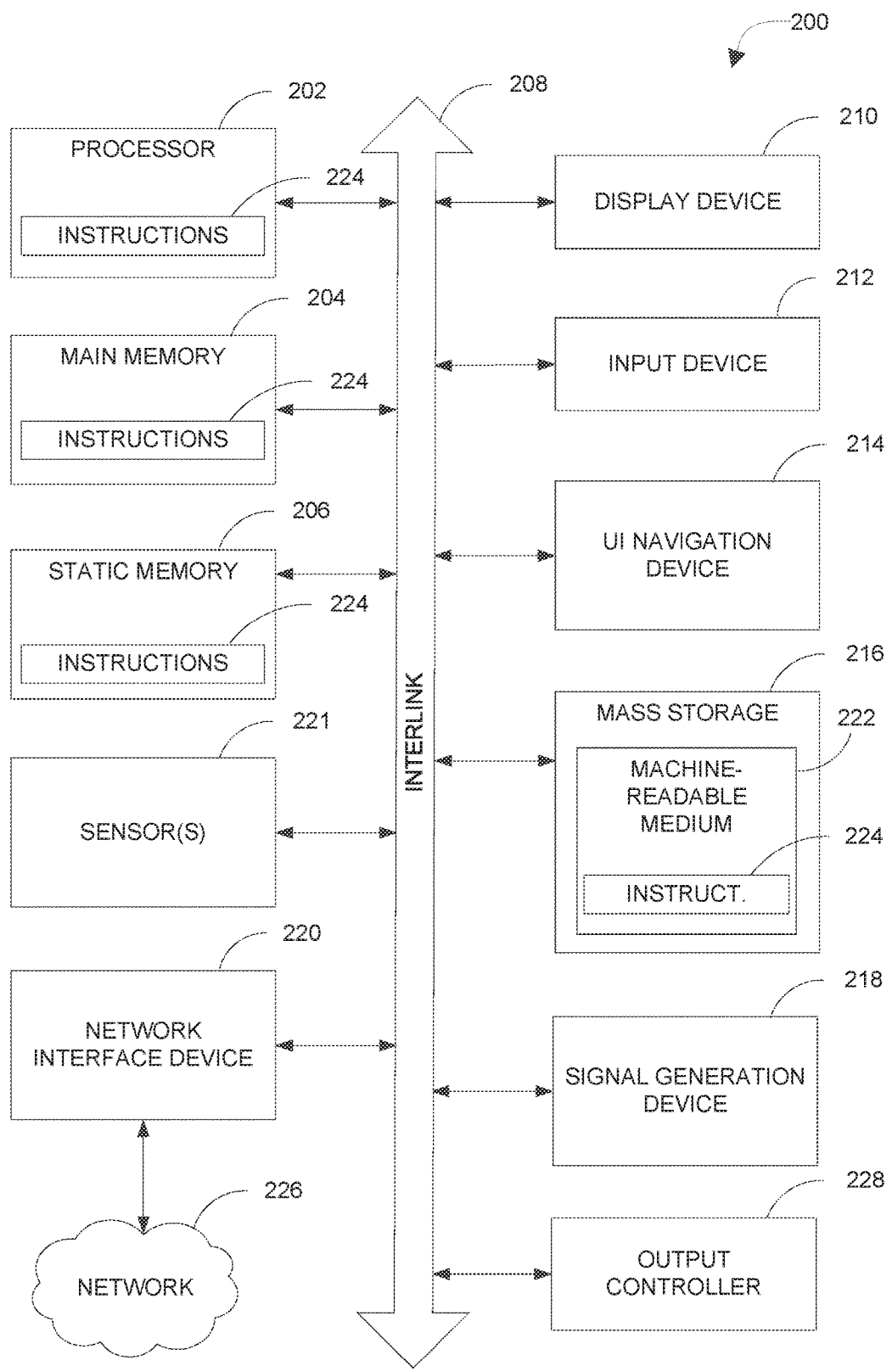
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP, such as the AP 102 of FIG. 1, a STA, such as one of the STAs 103 of FIG. 1, a UE, an evolved Node B (eNB), a mobile device, a base station, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
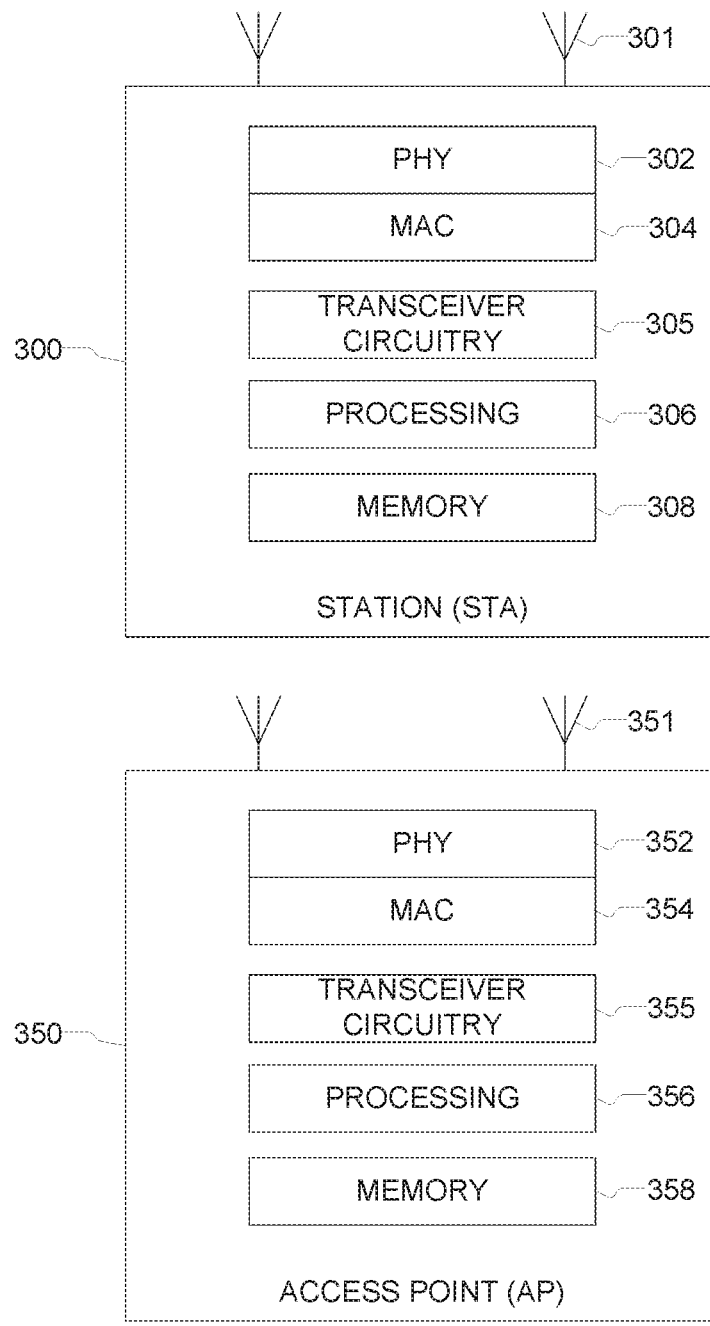
FIG. 3 illustrates a station (STA) in accordance with some embodiments and an access point (AP) in accordance with some embodiments.

FIG. 3 illustrates a station (STA) in accordance with some embodiments and an access point (AP) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control layer (MAC) circuitry 304 for controlling access to the wireless medium.

The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control layer (MAC) circuitry 354 for controlling access to the wireless medium. The AP 350 may also include processing circuitry 356 and memory 358 arranged to perform the operations described herein.

The antennas 301, 351, may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 and/or the AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

In some embodiments, the STA 300, AP 350, mobile device and/or base station may communicate using SCM signals transmitted over a single carrier communication channel. In some embodiments, the STA 300, AP 350, mobile device and/or base station may communicate using OFDM communication signals transmitted over a multicarrier communication channel. Accordingly, in some cases the STA 300, AP 350, mobile device and/or base station may be configured to receive signals in accordance with specific communication standards, such as the 802.11n-2009, IEEE 802.11-2012, 802.11n-2009, 802.11ac, 802.11ad, 802.11ax, and/or 802.11ay standards and/or proposed specifications for WLANs, although the scope of embodiments is not limited in this respect. and/or proposed specifications for WLANs including proposed HEW standards, although the scope of the embodiments is not limited in this respect as they may also be suitable to transmit and/or receive communications in accordance with other techniques and standards. In some other embodiments, the STA 300, AP 350, mobile device and/or base station may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation and/or single carrier frequency-division multiplexing (SC-FDM) although the scope of the embodiments is not limited in this respect.

In accordance with some embodiments, the STA 300 may determine, based at least partly on a training portion of a received protocol data unit (PDU), operational parameters including a signal quality metric and a carrier frequency offset (CFO) measurement. The STA 300 may decode a data portion of the PDU, the data portion comprising data symbols time-multiplexed with pilot symbols. The STA 300 may compare the signal quality metric to a predetermined signal quality threshold and compare the CFO measurement to a predetermined CFO threshold. If the signal quality metric is greater than or equal to the signal quality threshold and the CFO measurement is less than the CFO threshold, the STA 103 may decode the data portion using phase noise estimates of the pilot symbols. If the signal quality metric is less than the signal quality threshold or the CFO measurement is greater than or equal to the CFO threshold, the STA 103 may refrain from usage of the phase noise estimates of the pilot symbols to decode the data portion. These embodiments will be described in more detail below.

Scanning is a feature in wireless network management that a station (STA) uses to get information about basic service set (BSS) deployments in specific frequency bands and channels. This information is needed to make a decision to associate with a specific BSS, transfer to another BSS, create a BSS in specific frequency channel, switching channels and more. An important part of BSS features and parameters provided by scanning is link quality between communicating stations, typically between a non-AP STA and an AP. The link quality is measured by received channel power indicator (RCPI) or by received signal-to-noise indicator (RSNI). Specifically in case of scan procedure, RCPI/RSNI of a received beacon or probe response frame provides a link quality of the link a between non-AP STA and AP. In directive multi-gigabit (DMG) networks operating in 60 GHz, the link quality measurement at the reception of a beacon and a probe response frames does not provide accurate indication of link quality needed for data transfer. This is due to the fact that the transmitting and receiving antennas configuration of the communicating stations at beacon and probe reception are different (quasi-omni vs. directional) from the antennas configuration at time of data transfer. Link quality measured during beaconing in DMG is not representative as the basic connectivity achieved by DMG beaconing does not assume and does not require identification of best transmit sector of the device that transmits the DMG beacons. Beamforming procedures and specifically beam refinement protocol (BRP) used for data transfer may significantly improve link quality in relation to link quality while beaconing.

Figure 4:
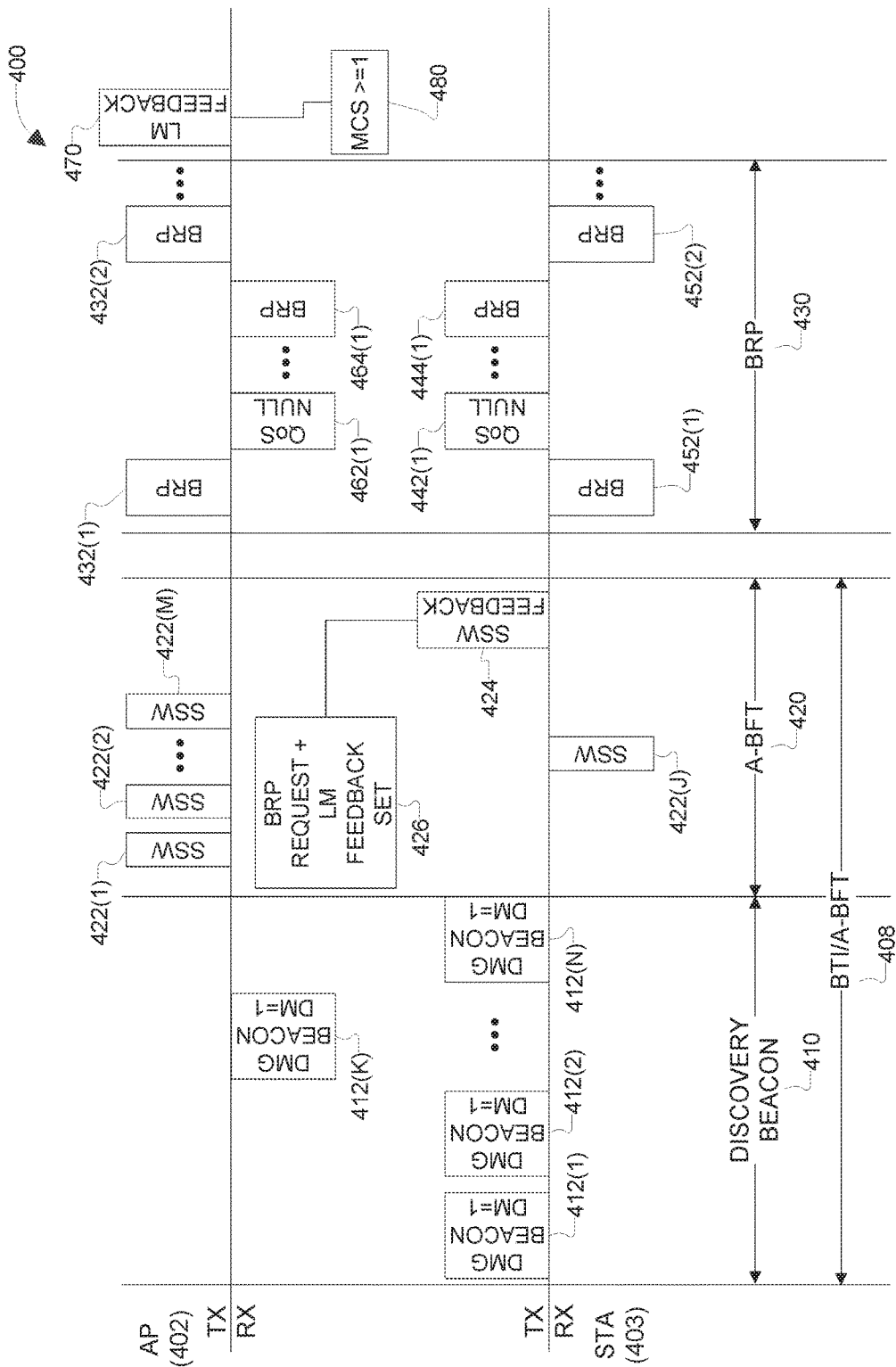
FIG. 4 depicts a signal flow diagram for a scanning process to perform a beam refinement procedure prior to association in accordance with some embodiments of the disclosure.

FIG. 4 depicts a signal flow diagram for a scanning process 400 to perform a beam refinement procedure prior to association in accordance with some embodiments of the disclosure. The scanning process 400 may between a 402 and a 403. The 402 may include the AP 102 of FIG. 1 or the AP 350 of FIG. 3. The 403 may include the STAs 103 of FIG. 1 or the 300 of FIG. 3.

The 403 may initiate the scanning process 400 that starts with the beacon transmit interval 408. During a discover beacon interval 410 of the beacon transmit interval 408, the 403 may transmit a series of DMG beacons 412(1-N). Each of the DMG beacons 412(1-N) may be encoded with an identifier associated with the 403 (e.g., DM=1), as well as a unique identifier associated with the individual ones of the DMG beacons 412(1-N). The 402 may receive a DMG beacon 412(K) of the DMG beacons 412(1-N).

The A-BFT interval 420 may take place after the discover beacon interval 410. During the A-BFT interval 420, the 402 may transmit sector sweep beacons 422(1-M). Each of the sector sweep beacons 422(1-M) may be encoded with information that identifies the 403, as well as information identifying the DMG beacon 412(K) received by the 402. The 403 may receive a sector sweep beacon 422(J) of the sector sweep beacons 422(1-M). Responsive to receipt of the sector sweep beacon 422(J), the 403 may transmit the sector sweep feedback signal 424. The sector sweep feedback signal 424 may be encoded with information identifying the sector sweep beacon 422(J). The sector sweep feedback signal 424 may also include a BRP request and LM feedback 426. The BRP request and LM feedback 426 may include a request to perform a beam refinement protocol (BRP) with link margin (LM) feedback. The medium access control sublayer management entity (MLME) scan confirm (e.g., MLME-SCAN.confirm) primitive may be updated to add a RequestBRP parameter to request the BRP. The RequestBRP parameter may present a BRP request field. FIG. 5 is a table of an exemplary BRS request field 500 according to some embodiments of the disclosure. The BRP request field 500 includes a LM feedback bit 504. When set, the LM Feedback bit 504 may instruct the AP 402 to provide a LM feedback 470 after the BRP interval 430. The BRP interval 430 may include a received signal-to-noise indicator (RNSI), a LM measurement, and a modulation and coding scheme (MCS) index value. The RNSI may be an integer value that conform to a RNSI element defined in the IEEE standards. The link margin may indicate a difference (e.g., in decibels) between a receive sensitivity (e.g., minimum receive power at which the 402 can decode information) and an actual receive power. The LM measurement may be an integer value that conforms to a DMG Link margin element defined in the IEEE standards. The MCS value may be greater than or equal to 1 (e.g., MCS1 or greater).

The data in the LM feedback 470 may be derived based on communication that occurs during the BRP interval 430. During the BRP interval 430, the 402 may provide a BRP signal 432(1) and, in response, the 403 may receive a BRP signal 452(1). The 403 may respond by transmitting a QoS null signal 442(1) followed by a BRP signal 444(1). Transmission information associated with the QoS null signal 442(1) and the BRP signal 444(1) may be based on information received in the BRP signal 452(1). In response, the 403 may receive a QoS null signal 462(1) and a BRP signal 464(1). The 402 may decode data included in the QoS null signal 462(1) and the BRP signal 464(1) and may transmit a BRP signal 432(2) modified from the BRP signal 432(1) based on the decoded data. In response, the 403 may receive a BRP signal 452(2). The process may continue until a best beam form configuration is achieved. The 403 may use data collected during the BRP interval 430 to compute the RNSI, the LM measurement, and a selected MCS index value.

The 402 may encode the LM feedback 470 with MCS index value (e.g., as defined in the 802.11 standards) greater than or equal to 1 (e.g., MCS1 or higher). The data included in the LM feedback 470 is an indication a receive link quality at the 402. The 403 may also need to perform a link measurement. To that end, in addition to encoding the LM feedback 470 with link quality data described above, the 402 may also encode in the LM feedback 470 a transmit power used to transmit the LM feedback 470, and may encode the LM feedback 470 with a physical layer convergence protocol (PLCP) service data unit (PSDU) size that is long enough (e.g., greater than 5.27 µs) for the 403 to perform a received link measurement The LM feedback 470 may be an A-MPDU that contains a link measurement request frame and QoS null frame and/or padding to get to a desired PSDU size. Thus, in addition to receiving link quality information from the perspective of the 402 in the LM feedback 470, the 403 may also use the LM feedback 470 to determine link quality measurements from its perspective. Based on these two data points, the 403 may determine whether to proceed with association, with the 402. A benefit of using the BRP and the LM feedback 470 (e.g., as compared with using signaling occurring during the beacon transmit interval 408) is that signaling use to transmit the BRP interval 430 messaging and the LM feedback 470 may more closely align with configurations that will be used during data transfer. Determine whether a link quality is acceptable to the 403 prior to completing an association process may result in a more efficient network.

Figure 6:
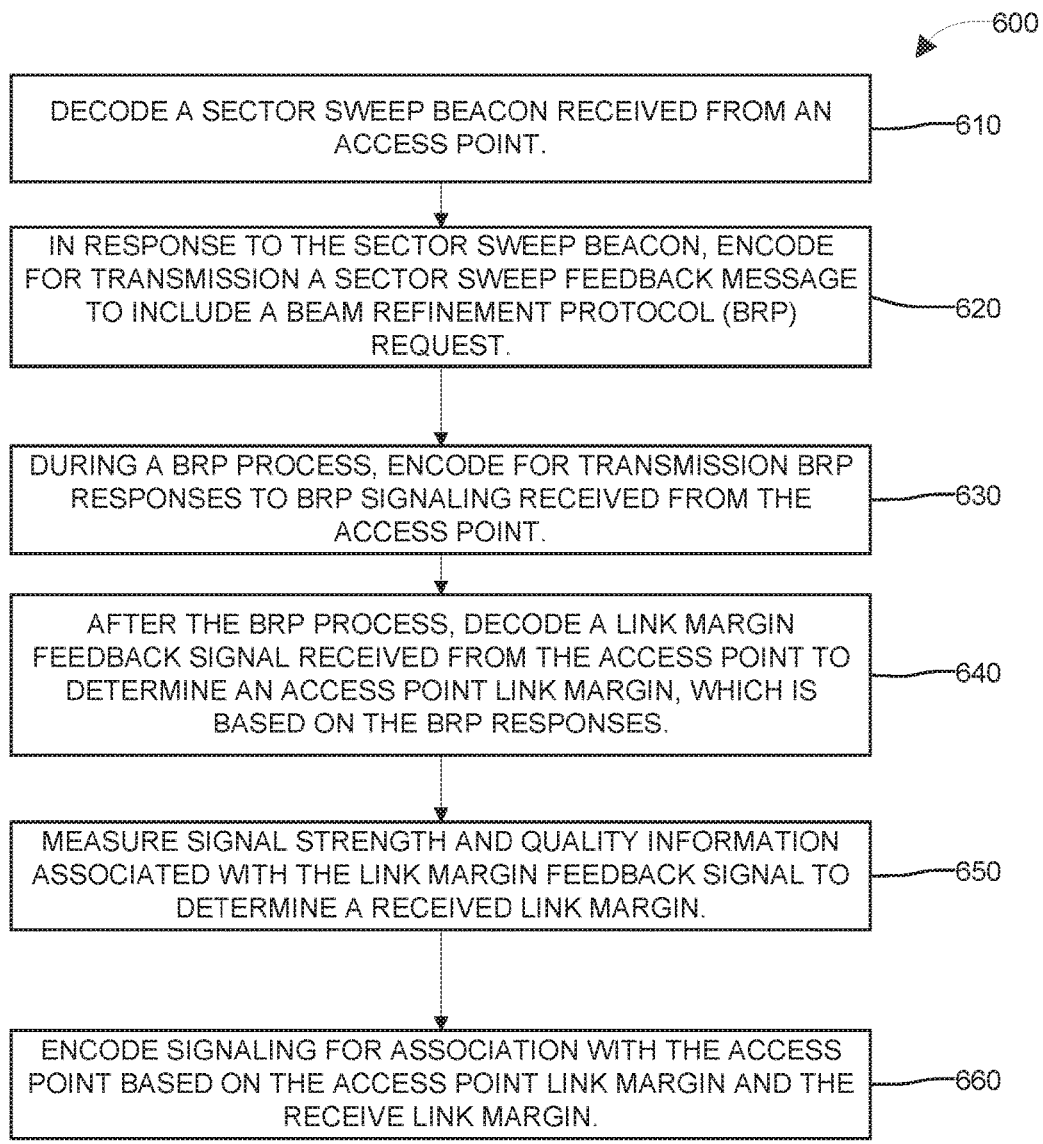
FIG. 6 illustrates a flowchart for a method to scan in a directive multi-gigabit system in accordance with some embodiments of the disclosure.

FIG. 6 illustrates a flowchart for a method 600 to scan in a directive multi-gigabit system in accordance with some embodiments of the disclosure. It is important to note that embodiments of the method 600 may include additional or even fewer operations or processes in comparison to what is illustrated in FIG. 6. In addition, embodiments of the method 600 are not necessarily limited to the chronological order that is shown in FIG. 6. In describing the method 600, reference may be made to FIGS. 1-5, although it is understood that the method 600 may be practiced with any other suitable systems, interfaces and components.

In addition, the method 600 and other methods described herein may refer to STAs 103 and/or AP 102 operating in accordance with one or more standards and/or protocols, such as 802.11, Wi-Fi, wireless local area network (W-LAN) and/or other, but embodiments of those methods are not limited to just those devices. In some embodiments, the method 600 and other methods described herein may be practiced by other mobile devices, such as an HEW STA, an HEW AP, an Evolved Node-B (eNB) or User Equipment (UE). The method 600 and other methods described herein may also be practiced by wireless devices configured to operate in other suitable types of wireless communication systems, including systems configured to operate according to various Third Generation Partnership Project (3GPP) Long Term Evolution (LTE) standards. The method 600 may also be applicable to an apparatus for the STAs 103 and/or the AP 102 or other device described above, in some embodiments.

The method 600 may include decoding a sector sweep beacon received from an access point, at 610. The sector sweep beacon may be received a station, such as the STAs 103 of FIG. 1, the STA 300 of FIG. 3, or the 403 of FIG. 4. The sector sweep beacon may include any one of the sector sweep beacons 422(1-M) of FIG. 4.

The method 600 may further include encoding for transmission a sector sweep feedback message to include a beam refinement protocol (BRP) request, at 620. The sector sweep feedback message may be included in the sector sweep feedback signal 424 of FIG. 4. Encoding the sector sweep feedback signal to include the BRP request may include setting a link margin feedback bit in a BRP request field. The link margin feedback bit (e.g., the LM feedback bit 504 of FIG. 5) is a request for the access point to provide the link margin feedback signal. The method 600 may further include encoding for transmission DMG beacons, wherein each of the DMG beacons is encoded with an identifier associated with the station. Encoding for transmission the sector sweep feedback signal may include causing the sector sweep signal to be transmitted may be based on a received DMG beacon identifier encoded in the sector sweep signal. In some examples, decoding the sector sweep beacon includes determining the DMG beacon identifier.

The method 600 may further include encoding for transmission BRP responses to BRP signaling received from the access point, at 630. The access point may include the AP 102 of FIG. 1, the AP 350 of FIG. 3, or the 402 of FIG. 4. The BRP responses may include the QoS null signal 442(1) or the BRP signals 444(1) of FIG. 4. The BRP signaling may include the BRP signals 452(1-2) of FIG. 4.

The method 600 may further include decoding a link margin feedback signal received from the access point to determine an access point link margin, at 640. The link margin feedback signal may include the LM feedback 470 of FIG. 4. The PSDU size of the link margin feedback signal may be greater than 5.27 µs. The method 600 may further include decoding the link margin feedback signal to determine a modulation and coding scheme index value. The method 600 may further include decoding the link margin feedback signal to determine a received signal-to-noise indicator.

The method 600 may further include measuring signal information associated with the link margin feedback signal to determine a received link margin measurement, at 650. The method 600 may further include measuring signal information associated with the link margin feedback signal to determine a received link margin measurement, at 660. In some examples, decoding the link margin feedback signal received from the access point to determine access point link quality includes receiving a transmit power value, wherein the receive link quality is based on the transmit power value.

Figure 7:
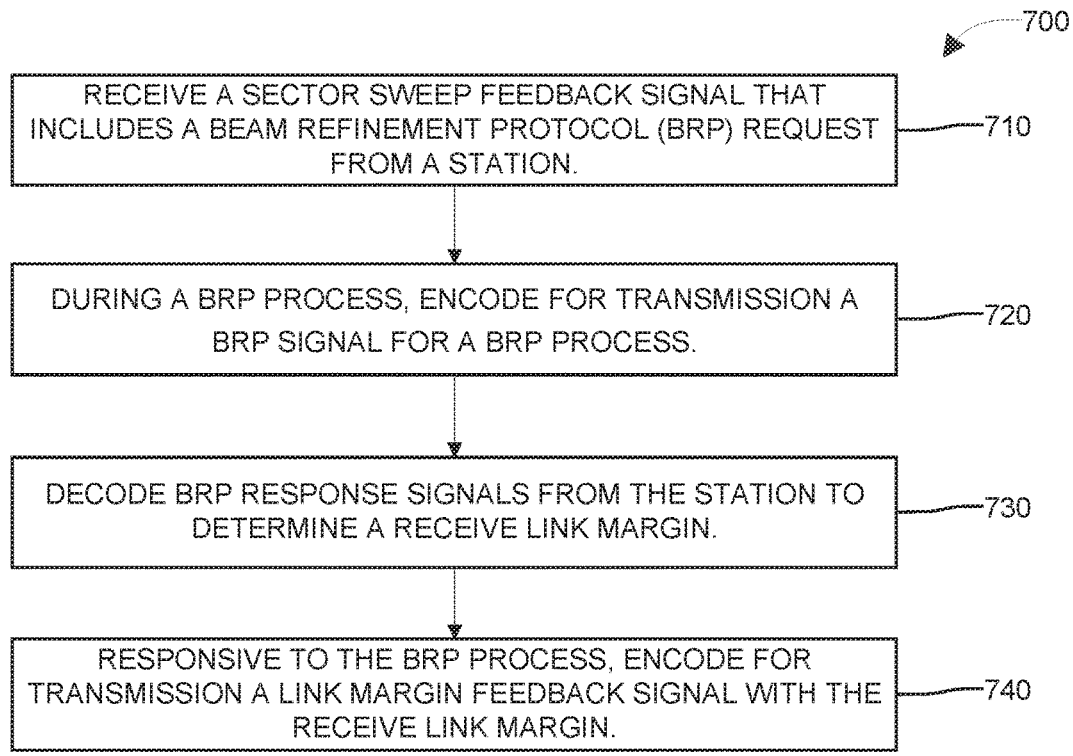
FIG. 7 illustrates a flowchart for a method to scan in a directive multi-gigabit system in accordance with some embodiments of the disclosure.

FIG. 7 illustrates a flowchart for a method 700 to scan in a directive multi-gigabit system in accordance with some embodiments of the disclosure. It is important to note that embodiments of the method 700 may include additional or even fewer operations or processes in comparison to what is illustrated in FIG. 7. In addition, embodiments of the method 700 are not necessarily limited to the chronological order that is shown in FIG. 7. In describing the method 700, reference may be made to FIGS. 1-5, although it is understood that the method 700 may be practiced with any other suitable systems, interfaces and components.

In addition, the method 700 and other methods described herein may refer to STAs 103 and/or AP 102 operating in accordance with one or more standards and/or protocols, such as 802.11, Wi-Fi, wireless local area network (W-LAN) and/or other, but embodiments of those methods are not limited to just those devices. In some embodiments, the method 700 and other methods described herein may be practiced by other mobile devices, such as an HEW STA, an HEW AP, an Evolved Node-B (eNB) or User Equipment (UE). The method 700 and other methods described herein may also be practiced by wireless devices configured to operate in other suitable types of wireless communication systems, including systems configured to operate according to various Third Generation Partnership Project (3GPP) Long Term Evolution (LTE) standards. The method 700 may also be applicable to an apparatus for the STAs 103 and/or the AP 102 or other device described above, in some embodiments.

The method 700 may include receiving a sector sweep feedback signal that includes a beam refinement protocol (BRP) request from a station, at 710. The sector sweep beacon may be received an access point, such as the AP 102 of FIG. 1, the AP 350 of FIG. 3, or the 402 of FIG. 4. The station may include the STAs 103 of FIG. 1, the STA 300 of FIG. 3, or the STA 403 of FIG. 4. The sector sweep feedback signal may be included in the sector sweep feedback signal 424 of FIG. 4. The method 700 may further include receiving a directive multi-gigabit (DMG) beacon, and encoding a sector sweep signal with an identifier from the DMG beacon. The sector sweep feedback signal may be provided in response to the sector sweep signal. The sector sweep signal may be included in any one of the sector sweep beacons 422(1-M) of FIG. 4.

The method 700 may further include encoding for transmission a BRP signal for a BRP process, at 720. The BRP process may occur prior to association between the station and the access point. The BRP signal may include any one of the BRP signals 432(1-2) of FIG. 4. The method 700 may further include decoding BRP response signals from the station to determine a receive link margin, at 730. The BRP response signals may include the QoS null signal 462(1) or the BRP signal 464(1) of FIG. 4. The sector sweep feedback message may be included in the sector sweep feedback signal 424 of FIG. 4. Encoding the sector sweep feedback signal to include the BRP request may include setting a link margin feedback bit in a BRP request field. The link margin feedback bit (e.g., the LM feedback bit 504 of FIG. 5) is a request for the access point to provide the link margin feedback signal. The method 700 may further include encoding for transmission DMG beacons, wherein each of the DMG beacons is encoded with an identifier associated with the station. Encoding for transmission the sector sweep feedback signal may include causing the sector sweep signal to be transmitted may be based on a received DMG beacon identifier encoded in the sector sweep signal. In some examples, decoding the sector sweep beacon includes determining the DMG beacon identifier.

The method 700 may further include responsive to completion of the BRP process, encoding for transmission a link margin feedback signal with the receive link margin, at 740. The link margin feedback signal may include the LM feedback 470 of FIG. 4. Encoding the link margin feedback signal may include determining a modulation and coding scheme index value based on the BRP response signals, and encoding the link margin feedback signal to include the modulation and coding scheme index value. Encoding the link margin feedback signal may further include determining a received signal-to-noise indicator based on BRP response signals, and encoding the link margin feedback signal to include the received signal-to-noise indicator. In some examples, the BRP request may include a link margin feedback request. The method 700 may further include encoding for transmission the link margin feedback signal with the receive link margin is in response to the link margin feedback request. The PSDU size of the link margin feedback signal may be greater than 5.27 μs. The link margin feedback signal may be encoded as an aggregate media access control protocol data unit. The link margin feedback signal may be encoded with a link measurement request frame and a quality of service null frame. The link margin feedback signal may be encoded to include a transmit power value.

The method 700 may further include measuring signal information associated with the link margin feedback signal to determine a received link margin measurement, at 750. The method 700 may further include measuring signal information associated with the link margin feedback signal to determine a received link margin measurement, at 760. In some examples, decoding the link margin feedback signal received from the access point to determine access point link quality includes receiving a transmit power value, wherein the receive link quality is based on the transmit power value.

ADDITIONAL NOTES & EXAMPLES

Example 1 is an apparatus of a station, the apparatus comprising: processing circuitry, configured to: decode a sector sweep beacon received from an access point; encode for transmission a sector sweep feedback message to include a beam refinement protocol (BRP) request; encode for transmission BRP responses to BRP signaling received from the access point; decode a link margin feedback signal received from the access point to determine an access point link margin; measure signal information associated with the link margin feedback signal to determine a received link margin measurement; and encode signaling for association with the access point based on the access point link quality and the receive link quality.

In Example 2, the subject matter of Example 1 optionally includes wherein the processing circuitry further configured to decode the link margin feedback signal to determine a modulation and coding scheme index value.

In Example 3, the subject matter of Example 2 optionally includes wherein the processing circuitry further configured to decode the link margin feedback signal to determine a received signal-to-noise indicator.

In Example 4, the subject matter of any one or more of Examples 1-3 optionally include wherein to encode for transmission the sector sweep feedback signal to include the BRP request includes the processing circuitry configured to set a link margin feedback bit in a BRP request field, wherein the link margin feedback bit is a request for the access point to provide the link margin feedback signal.

In Example 5, the subject matter of any one or more of Examples 1-4 optionally include μs.

In Example 6, the subject matter of any one or more of Examples 1-5 optionally include wherein to decode the link margin feedback signal received from the access point to determine access point link quality includes the processing circuitry configured to receive a transmit power value, wherein the receive link quality is based on the transmit power value.

In Example 7, the subject matter of any one or more of Examples 1-6 optionally include wherein the processing circuitry further configured to encode for transmission directive multi-gigabit (DMG) beacons, wherein each of the DMG beacons is encoded with an identifier associated with the station.

In Example 8, the subject matter of any one or more of Examples 1-7 optionally include wherein to encode for transmission the sector sweep feedback signal includes the processing circuitry configured to cause the sector sweep signal to be transmitted based on a received DMG beacon identifier encoded in the sector sweep signal.

In Example 9, the subject matter of Example 8 optionally includes wherein to decode the sector sweep beacon includes the processing circuitry configured to determine the DMG beacon identifier.

Example 10 is an apparatus of an access point, the apparatus comprising: processing circuitry, configured to: receive a sector sweep feedback signal that includes a beam refinement protocol (BRP) request from a station; encode for transmission a BRP signal for a BRP process; decode BRP response signals from the station to determine a receive link margin; and responsive to completion of the BRP process, encode for transmission a link margin feedback signal with the receive link margin.

In Example 11, the subject matter of Example 10 optionally includes wherein the processing circuitry further configured to decode the link margin feedback signal to: determine a modulation and coding scheme index value based on the BRP response signals; and encode the link margin feedback signal to include the modulation and coding scheme index value.

In Example 12, the subject matter of Example 11 optionally includes wherein the processing circuitry further configured to decode the link margin feedback signal to: determine a received signal-to-noise indicator based on BRP response signals and encode the link margin feedback signal to include the received signal-to-noise indicator.

In Example 13, the subject matter of any one or more of Examples 10-12 optionally include wherein the BRP request includes a link margin feedback request, wherein the processing circuitry configured to encode for transmission the link margin feedback signal with the receive link margin is in response to the link margin feedback request.

In Example 14, the subject matter of any one or more of Examples 10-13 optionally include μs.

In Example 15, the subject matter of any one or more of Examples 10-14 optionally include wherein the processing circuitry configured to encode for transmission the link margin feedback signal as an aggregate media access control protocol data unit.

In Example 16, the subject matter of any one or more of Examples 10-15 optionally include wherein the processing circuitry configured to encode for transmission the link margin feedback signal with a link measurement request frame and a quality of service null frame.

In Example 17, the subject matter of any one or more of Examples 10-16 optionally include wherein the processing circuitry configured to encode for transmission the link margin feedback signal to include a transmit power value.

In Example 18, the subject matter of any one or more of Examples 10-17 optionally include wherein the processing circuitry further configured to: receive a directive multi-gigabit (DMG) beacon; and encode a sector sweep signal with an identifier from the DMG beacon, wherein the sector sweep feedback signal is provided in response to the sector sweep signal.

Example 19 is at least one machine readable medium including instructions to scan in a directive multi-gigabit system, the instructions, when executed by a machine, cause the machine to perform operations comprising: decoding a sector sweep beacon received from an access point; encoding for transmission a sector sweep feedback message to include a beam refinement protocol (BRP) request; encoding for transmission BRP responses to BRP signaling received from the access point; decoding a link margin feedback signal received from the access point to determine an access point link margin; measuring signal information associated with the link margin feedback signal to determine a received link margin measurement; and encoding signaling for association with the access point based on the access point link quality and the receive link quality.

In Example 20, the subject matter of Example 19 optionally includes wherein the operations further comprise decoding the link margin feedback signal to determine a modulation and coding scheme index value.

In Example 21, the subject matter of Example 20 optionally includes wherein the operations further comprise decoding the link margin feedback signal to determine a received signal-to-noise indicator.

In Example 22, the subject matter of any one or more of Examples 19-21 optionally include wherein the operations for encoding for transmission the sector sweep feedback signal to include the BRP request further include operations for setting a link margin feedback bit in a BRP request field, wherein the link margin feedback bit is a request for the access point to provide the link margin feedback signal.

In Example 23, the subject matter of any one or more of Examples 19-22 optionally include μs.

In Example 24, the subject matter of any one or more of Examples 19-23 optionally include wherein the operations for decoding the link margin feedback signal received from the access point to determine access point link quality further include operations for receiving a transmit power value, wherein the receive link quality is based on the transmit power value.

In Example 25, the subject matter of any one or more of Examples 19-24 optionally include wherein the operations further comprise encoding for transmission directive multi-gigabit (DMG) beacons, wherein each of the DMG beacons is encoded with an identifier associated with the station.

In Example 26, the subject matter of any one or more of Examples 19-25 optionally include wherein the operations for encoding for transmission the sector sweep feedback signal further include operations for causing the sector sweep signal to be transmitted based on a received DMG beacon identifier encoded in the sector sweep signal.

In Example 27, the subject matter of Example 26 optionally includes wherein the operations for decoding the sector sweep beacon includes determining the DMG beacon identifier.

Example 28 is at least one machine readable medium including instructions to scan in a directive multi-gigabit system, the instructions, when executed by a machine, cause the machine to perform operations comprising: receiving a sector sweep feedback signal that includes a beam refinement protocol (BRP) request from a station; encoding for transmission a BRP signal for a BRP process, decoding BRP response signals from the station to determine a receive link margin; and responsive to completion of the BRP process, encoding for transmission a link margin feedback signal with the receive link margin.

In Example 29, the subject matter of Example 28 optionally includes wherein the operations for encoding the link margin feedback signal further include operations for: determining a modulation and coding scheme index value based on the BRP response signals; and encoding the link margin feedback signal to include the modulation and coding scheme index value.

In Example 30, the subject matter of Example 29 optionally includes wherein the operations for encoding the link margin feedback signal further include operations for: determining a received signal-to-noise indicator based on BRP response signals; and encoding the link margin feedback signal to include the received signal-to-noise indicator.

In Example 31, the subject matter of any one or more of Examples 28-30 optionally include wherein the BRP request includes a link margin feedback request, wherein the operations further comprise encoding for transmission the link margin feedback signal with the receive link margin is in response to the link margin feedback request.

In Example 32, the subject matter of any one or more of Examples 28-31 optionally include μs.

In Example 33, the subject matter of any one or more of Examples 28-32 optionally include wherein the operations further comprise encoding for transmission the link margin feedback signal as an aggregate media access control protocol data unit.

In Example 34, the subject matter of any one or more of Examples 28-33 optionally include wherein the operations further comprise encoding for transmission the link margin feedback signal with a link measurement request frame and a quality of service null frame.

In Example 35, the subject matter of any one or more of Examples 28-34 optionally include wherein the operations further comprise encoding for transmission the link margin feedback signal to include a transmit power value.

In Example 36, the subject matter of any one or more of Examples 28-35 optionally include wherein the operations further comprise: receiving a directive multi-gigabit (DMG) beacon; and encoding a sector sweep signal with an identifier from the DMG beacon, wherein the sector sweep feedback signal is provided in response to the sector sweep signal.

Example 37 is a method to scan in a directive multi-gigabit system, the method comprising: decoding a sector sweep beacon received from an access point; encoding for transmission a sector sweep feedback message to include a beam refinement protocol (BRP) request; encoding for transmission BRP responses to BRP signaling received from the access point; decoding a link margin feedback signal received from the access point to determine an access point link margin; measuring signal information associated with the link margin feedback signal to determine a received link margin measurement; and encoding signaling for association with the access point based on the access point link quality and the receive link quality.

In Example 38, the subject matter of Example 37 optionally includes decoding the link margin feedback signal to determine a modulation and coding scheme index value.

In Example 39, the subject matter of Example 38 optionally includes decoding the link margin feedback signal to determine a received signal-to-noise indicator.

In Example 40, the subject matter of any one or more of Examples 37-39 optionally include wherein encoding for transmission the sector sweep feedback signal to include the BRP request includes setting a link margin feedback bit in a BRP request field, wherein the link margin feedback bit is a request for the access point to provide the link margin feedback signal.

In Example 41, the subject matter of any one or more of Examples 37-40 optionally include μs.

In Example 42, the subject matter of any one or more of Examples 37-41 optionally include wherein decoding the link margin feedback signal received from the access point to determine access point link quality includes receiving a transmit power value, wherein the receive link quality is based on the transmit power value.

In Example 43, the subject matter of any one or more of Examples 37-42 optionally include encoding for transmission directive multi-gigabit (DMG) beacons, wherein each of the DMG beacons is encoded with an identifier associated with the station.

In Example 44, the subject matter of any one or more of Examples 37-43 optionally include wherein encoding for transmission the sector sweep feedback signal includes causing the sector sweep signal to be transmitted based on a received DMG beacon identifier encoded in the sector sweep signal.

In Example 45, the subject matter of Example 44 optionally includes wherein decoding the sector sweep beacon includes determining the DMG beacon identifier.

Example 46 is at least one machine readable medium including instructions that, when executed by a machine, cause the machine to perform any method of Examples 37-45.

Example 47 is a system comprising means to perform any method of Examples 37-45.

Example 48 is a method to scan in a directive multi-gigabit system, the method comprising: receiving a sector sweep feedback signal that includes a beam refinement protocol (BRP) request from a station; encoding for transmission a BRP signal for a BRP process; decoding BRP response signals from the station to determine a receive link margin; and responsive to completion of the BRP process, encoding for transmission a link margin feedback signal with the receive link margin.

In Example 49, the subject matter of Example 48 optionally includes wherein encoding the link margin feedback signal includes: determining a modulation and coding scheme index value based on the BRP response signals, and encoding the link margin feedback signal to include the modulation and coding scheme index value.

In Example 50, the subject matter of Example 49 optionally includes wherein encoding the link margin feedback signal includes: determining a received signal-to-noise indicator based on BRP response signals; and encoding the link margin feedback signal to include the received signal-to-noise indicator.

In Example 51, the subject matter of any one or more of Examples 48-50 optionally include wherein the BRP request includes a link margin feedback request, the method further comprising encoding for transmission the link margin feedback signal with the receive link margin is in response to the link margin feedback request.

In Example 52, the subject matter of any one or more of Examples 48-51 optionally include μs.

In Example 53, the subject matter of any one or more of Examples 48-52 optionally include encoding for transmission the link margin feedback signal as an aggregate media access control protocol data unit.

In Example 54, the subject matter of any one or more of Examples 48-53 optionally include encoding for transmission the link margin feedback signal with a link measurement request frame and a quality of service null frame.

In Example 55, the subject matter of any one or more of Examples 48-54 optionally include encoding for transmission the link margin feedback signal to include a transmit power value.

In Example 56, the subject matter of any one or more of Examples 48-55 optionally include receiving a directive multi-gigabit (DMG) beacon; and encoding a sector sweep signal with an identifier from the DMG beacon, wherein the sector sweep feedback signal is provided in response to the sector sweep signal.

Example 57 is at least one machine readable medium including instructions that, when executed by a machine, cause the machine to perform any method of Examples 48-56.

Example 58 is a system comprising means to perform any method of Examples 48-56.

Example 59 is an apparatus to scan in a directive multi-gigabit system, the apparatus comprising: means for decoding a sector sweep beacon received from an access point; means for encoding for transmission a sector sweep feedback message to include a beam refinement protocol (BRP) request; means for encoding for transmission BRP responses to BRP signaling received from the access point; means for decoding a link margin feedback signal received from the access point to determine an access point link margin; means for measuring signal information associated with the link margin feedback signal to determine a received link margin measurement; and means for encoding signaling for association with the access point based on the access point link quality and the receive link quality.

In Example 60, the subject matter of Example 59 optionally includes means for decoding the link margin feedback signal to determine a modulation and coding scheme index value.

In Example 61, the subject matter of Example 60 optionally includes means for decoding the link margin feedback signal to determine a received signal-to-noise indicator.

In Example 62, the subject matter of any one or more of Examples 59-61 optionally include wherein encoding for transmission the sector sweep feedback signal to include the BRP request includes means for setting a link margin feedback bit in a BRP request field, wherein the link margin feedback bit is a request for the access point to provide the link margin feedback signal.

In Example 63, the subject matter of any one or more of Examples 59-62 optionally include μs.

In Example 64, the subject matter of any one or more of Examples 59-63 optionally include wherein decoding the link margin feedback signal received from the access point to determine access point link quality includes means for receiving a transmit power value, wherein the receive link quality is based on the transmit power value.

In Example 65, the subject matter of any one or more of Examples 59-64 optionally include means for encoding for transmission directive multi-gigabit (DMG) beacons, wherein each of the DMG beacons is encoded with an identifier associated with the station.

In Example 66, the subject matter of any one or more of Examples 59-65 optionally include wherein encoding for transmission the sector sweep feedback signal includes means for causing the sector sweep signal to be transmitted based on a received DMG beacon identifier encoded in the sector sweep signal.

In Example 67, the subject matter of Example 66 optionally includes wherein decoding the sector sweep beacon includes means for determining the DMG beacon identifier.

Example 68 is an apparatus to scan in a directive multi-gigabit system, the apparatus comprising: means for receiving a sector sweep feedback signal that includes a beam refinement protocol (BRP) request from a station; means for encoding for transmission a BRP signal for a BRP process; means for decoding BRP response signals from the station to determine a receive link margin; and means for responsive to completion of the BRP process, encoding for transmission a link margin feedback signal with the receive link margin.

In Example 69, the subject matter of Example 68 optionally includes wherein encoding the link margin feedback signal includes: means for determining a modulation and coding scheme index value based on the BRP response signals; and means for encoding the link margin feedback signal to include the modulation and coding scheme index value.

In Example 70, the subject matter of Example 69 optionally includes wherein encoding the link margin feedback signal includes: means for determining a received signal-to-noise indicator based on BRP response signals; and means for encoding the link margin feedback signal to include the received signal-to-noise indicator.

In Example 71, the subject matter of any one or more of Examples 68-70 optionally include wherein the BRP request includes a link margin feedback request, the apparatus further comprising means for encoding for transmission the link margin feedback signal with the receive link margin is in response to the link margin feedback request.

In Example 72, the subject matter of any one or more of Examples 68-71 optionally include μs.

In Example 73, the subject matter of any one or more of Examples 68-72 optionally include means for encoding for transmission the link margin feedback signal as an aggregate media access control protocol data unit.

In Example 74, the subject matter of any one or more of Examples 68-73 optionally include means for encoding for transmission the link margin feedback signal with a link measurement request frame and a quality of service null frame.

In Example 75, the subject matter of any one or more of Examples 68-74 optionally include means for encoding for transmission the link margin feedback signal to include a transmit power value.

In Example 76, the subject matter of any one or more of Examples 68-75 optionally include means for receiving a directive multi-gigabit (DMG) beacon; and means for encoding a sector sweep signal with an identifier from the DMG beacon, wherein the sector sweep feedback signal is provided in response to the sector sweep signal.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station, the apparatus comprising:
processing circuitry, configured to:
decode a sector sweep beacon received from an access point;
encode for transmission a sector sweep feedback message to include a beam refinement protocol (BRP) request;
encode for transmission a BRP response to BRP signaling received from the access point, the BRP response including a request for the access point to provide a link margin feedback signal;
decode the link margin feedback signal received from the access point, the link margin feedback signal including a link margin of the access point and a transmit power value of the access point;
measure signal information associated with the link margin feedback signal to determine a received link margin measurement; and
encode signaling for association with the access point based on the received link margin measurement and the transmit power value.

2. The apparatus according to claim 1, wherein the processing circuitry further configured to decode the link margin feedback signal to determine a modulation and coding scheme index value.

3. The apparatus according to claim 2, wherein the processing circuitry further configured to decode the link margin feedback signal to determine a received signal-to-noise indicator.

4. The apparatus according to claim 1, wherein to encode for transmission the sector sweep feedback signal to include the BRP request includes the processing circuitry configured to set a link margin feedback bit in a BRP request field, wherein the link margin feedback bit is the request for the access point to provide the link margin feedback signal.

5. The apparatus according to claim 1, wherein a physical layer convergence protocol (PLCP) service data unit (PSDU) size of the link margin feedback signal is greater than 5.27 µs.

6. The apparatus according to claim 1, wherein the processing circuitry further configured to encode for transmission directive multi-gigabit (DMG) beacons, wherein each of the DMG beacons is encoded with an identifier associated with the station.

7. The apparatus according to claim 1, wherein to encode for transmission the sector sweep feedback signal includes the processing circuitry configured to cause the sector sweep signal to be transmitted based on a received directive multi-gigabit (DMG) beacon identifier encoded in the sector sweep signal.

8. The apparatus according to claim 7, wherein to decode the sector sweep beacon includes the processing circuitry configured to determine the DMG beacon identifier.

9. A method to scan in a directive multi-gigabit system, the method comprising:
  decoding a sector sweep beacon received from an access point;
  encoding for transmission a sector sweep feedback message to include a beam refinement protocol (BRP) request;
  encoding for transmission a BRP response to BRP signaling received from the access point, the BRP response including a request for the access point to provide a link margin feedback signal;
  decoding the link margin feedback signal received from the access point, the link margin feedback signal including a link margin of the access point and a transmit power value of the access point;
  measuring signal information associated with the link margin feedback signal to determine a received link margin measurement; and
  encoding signaling for association with the access point based on the received link margin measurement and the transmit power value.

10. The method according to claim 9, further comprising decoding the link margin feedback signal to determine a modulation and coding scheme index value.

11. The method according to claim 10, further comprising decoding the link margin feedback signal to determine a received signal-to-noise indicator.

12. The method according to claim 9, wherein encoding for transmission the sector sweep feedback signal to include the BRP request includes setting a link margin feedback bit in a BRP request field, wherein the link margin feedback bit is the request for the access point to provide the link margin feedback signal.

13. The method according to claim 9, wherein a physical layer convergence protocol (PUT) service data unit (PSDU) size of the link margin feedback signal is greater than 5.27 µs.

* * * * *

UNITED STATES PATENT AND TRADEMARK OFFICE
CERTIFICATE OF CORRECTION

PATENT NO. : 10,334,511 B2
APPLICATION NO. : 15/396241
DATED : June 25, 2019
INVENTOR(S) : Trainin et al.

Page 1 of 1

It is certified that error appears in the above-identified patent and that said Letters Patent is hereby corrected as shown below:

In the Claims

In Column 22, Line 25, in Claim 13, delete "(PUT)" and insert --(PLCP)-- therefor Signed and Sealed this
Twenty-eighth Day of April, 2020

Andrei Iancu
*Director of the United States Patent and Trademark Office*